(12) United States Patent
Davidian et al.

(10) Patent No.: US 10,281,208 B2

(45) Date of Patent: May 7, 2019

(54) METHOD AND APPARATUS FOR SEPARATING A CARBON DIOXIDE-RICH GAS

(71) Applicant: L'Air Liquide, Societe Anonyme pour l'Etude et l'Exploitation des Procedes Georges Claude, Paris (FR)

(72) Inventors: Benoit Davidian, Saint Maur des Fosses (FR); Mathieu Leclerc, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 981 days.

(21) Appl. No.: 14/413,771

(22) PCT Filed: Jul. 11, 2013

(86) PCT No.: PCT/FR2013/051658
§ 371 (c)(1),
(2) Date: Jan. 9, 2015

(87) PCT Pub. No.: WO2014/009664
PCT Pub. Date: Jan. 16, 2014

(65) Prior Publication Data
US 2015/0168054 A1    Jun. 18, 2015

(30) Foreign Application Priority Data

Jul. 13, 2012 (FR) ...................... 12 56785

(51) Int. Cl.
*F25J 3/06* (2006.01)
*F25J 5/00* (2006.01)
*F25J 3/02* (2006.01)

(52) U.S. Cl.
CPC .............. *F25J 3/067* (2013.01); *F25J 3/0266* (2013.01); *F25J 5/002* (2013.01); *F25J 3/0223* (2013.01);
(Continued)

(58) Field of Classification Search
CPC .......... F25J 3/0223; F25J 3/0266; F25J 3/067; Y02C 10/12; B01D 53/62
(Continued)

(56) References Cited

U.S. PATENT DOCUMENTS 3,614,872 A    10/1971  Tassoney et al.
4,417,449 A *  11/1983  Hegarty .................. C10G 1/002
                                            62/622

(Continued)

FOREIGN PATENT DOCUMENTS

FR    1 256 771    3/1961
FR    1 256 778    3/1961
(Continued)

OTHER PUBLICATIONS

International Search Report and Written Opinion for PCT/FR2013/051658, dated Oct. 1, 2015.

*Primary Examiner* — John F Pettitt, III
(74) *Attorney, Agent, or Firm* — Justin K. Murray

(57) ABSTRACT

In a purification method, a carbon dioxide-rich gas is cooled in a first brazed aluminum plate-fin heat exchanger, the cooled gas or at least one fluid derived from the cooled gas is sent to a purification step comprising a distillation step, the purification step produces a carbon dioxide-rich liquid which is cooled, then expanded, then sent to a second heat exchanger where it is heated by means of a fluid of the method, the exchanger carrying out an indirect heat exchange only between the carbon dioxide-rich liquid and the fluid of the method, the carbon dioxide-rich liquid at (Continued)

least partially vaporizes in the second exchanger and the vaporized gas formed heats up again in the first exchanger to form a carbon dioxide-rich gas.

6 Claims, 3 Drawing Sheets

(52) U.S. Cl.
CPC ............ *F25J 5/005* (2013.01); *F25J 2200/02* (2013.01); *F25J 2200/40* (2013.01); *F25J 2200/70* (2013.01); *F25J 2205/04* (2013.01); *F25J 2205/40* (2013.01); *F25J 2205/66* (2013.01); *F25J 2205/80* (2013.01); *F25J 2210/70* (2013.01); *F25J 2220/82* (2013.01); *F25J 2220/84* (2013.01); *F25J 2230/20* (2013.01); *F25J 2230/30* (2013.01); *F25J 2230/32* (2013.01); *F25J 2235/80* (2013.01); *F25J 2240/90* (2013.01); *F25J 2250/30* (2013.01); *F25J 2270/02* (2013.01); *F25J 2290/32* (2013.01); *F25J 2290/34* (2013.01); *Y02C 10/12* (2013.01)

(58) Field of Classification Search
USPC .......................................................... 62/617
See application file for complete search history.

(56) References Cited

U.S. PATENT DOCUMENTS

| 5,352,272 | A | * | 10/1994 | Moll | ...................... B01D 53/22 96/14 |
|---|---|---|---|---|---|
| 2002/0059807 | A1 | | 5/2002 | Wong et al. | |
| 2004/0251008 | A1 | * | 12/2004 | O'Neill | ................ F25J 3/04412 165/166 |
| 2009/0013868 | A1 | | 1/2009 | Darde et al. | |
| 2010/0326134 | A1 | | 12/2010 | Johnke et al. | |

FOREIGN PATENT DOCUMENTS

| FR | 2 967 485 | 5/2012 | |
| FR | 2971044 A1 | * 8/2012 | ............ F25J 3/0266 |
| FR | 2993187 A1 | 1/2014 | |
| FR | 2993353 A1 | 1/2014 | |
| WO | WO 2011/089383 | 7/2011 | |
| WO | WO 2012/030223 | 3/2012 | |

* cited by examiner

METHOD AND APPARATUS FOR SEPARATING A CARBON DIOXIDE-RICH GAS

CROSS REFERENCE TO RELATED APPLICATIONS

This application is a § 371 of International PCT Application PCT/FR2013/051658, filed Jul. 11, 2013, which claims the benefit of FR1256785, filed Jul. 13, 2012, both of which are herein incorporated by reference in their entireties.

TECHNICAL FIELD OF THE INVENTION

The present invention relates to a method and an apparatus for separating a carbon dioxide-rich gas by distillation at sub-ambient temperature.

BACKGROUND

A carbon dioxide-rich gas contains at least 60 mol % of carbon dioxide, or even at least 80 mol % of carbon dioxide.

The remainder of the gas may contain one or more of the following components: oxygen, nitrogen, argon, nitrogen oxide (NO or $NO_2$ or $N_2O$), carbon monoxide, hydrogen, mercury.

Purification may be carried out in one or more successive steps of partial condensation and/or by distillation.

In numerous cryogenic applications, the production of cold by the unit is performed by vaporizing a liquid at a pressure that is low enough to reach sufficiently low temperatures. Because the liquid is not necessarily obtained in the method at this pressure, it is necessary to expand it, and this may generate the production of gas. The gas thus obtained will not generate a great deal of cold because it will transfer only sensible heat. It is therefore advantageous to limit the production of gas by supercooling the liquid before expansion.

The patent application filed under number FR-1256778 offers a solution for the layout of the cold box of a $CO_2$ capture unit with the exchange line separated into two parts, one of them technologically simpler making it possible to reduce the risk of the cold box freezing solid.

The patent application filed under number FR-1256771 offers a solution for incorporating cryogenic membranes into the cold box of a $CO_2$ capture unit.

SUMMARY OF THE INVENTION

The present invention involves optimizing the exchange line of the cold box which is divided into two parts by the addition notably of a supercooler.

According to one subject of the invention there is provided a method of purifying a carbon dioxide-rich gas at low temperature in order to produce a carbon dioxide-rich fluid, in which method:

i) the carbon dioxide-rich gas is cooled in a first, brazed aluminum plate-type heat exchanger made up of corrugated layers separated by plates, ii) the cooled gas or at least a fluid derived from the cooled gas is sent to a purification step comprising a distillation step and/or at least two successive partial-condensation steps, iii) the purification step produces a carbon dioxide-impoverished gas which is heated up in the first exchanger, iv) the purification step produces a carbon dioxide-rich liquid which is cooled, next expanded then sent to a second heat exchanger where it is warmed up by means of a process fluid which is a gas derived from the gas cooled in the first exchanger, the exchanger performing an indirect exchange of heat only between the carbon dioxide-rich liquid and the process fluid, and v) the carbon dioxide-rich liquid vaporizes at least partially in the second exchanger and the vaporized gas formed is warmed up in the first exchanger to form a carbon dioxide-rich gas that may be the end-product of the method characterized in that the cooled gas condenses at least partially in the first exchanger and is sent to a first phase separator and the gas from the first phase separator is sent to the second exchanger where it condenses to form condensed liquid.

According to other optional aspects:
- the carbon dioxide-rich gas is compressed and condensed to form a carbon dioxide-rich liquid which is an end-product of the method.
- the liquid from the first phase separator is expanded and sent to a second phase separator or to the distillation column.
- the condensed liquid is sent to the second phase separator and the liquid from the second phase separator is sent to the top of the distillation column to feed the distillation column.
- the gas from the second phase separator is warmed up in the first exchanger.
- the second exchanger is a tube and shell exchanger, the carbon dioxide-rich liquid being sent to warm up in the shell and the process fluid being sent to cool down in the tubes.
- the carbon dioxide-rich liquid is cooled before expansion in a heat exchanger by indirect exchange of heat with the carbon dioxide-impoverished gas which is warmed up in the first exchanger.
- the carbon dioxide-rich liquid is cooled in a third exchanger or in the first exchanger upstream of the expansion.
- the gas from the second phase separator is separated by permeation.

According to another subject of the invention, there is provided an apparatus for purifying a gas containing carbon dioxide at low temperature to produce a carbon dioxide-rich fluid, comprising a first, brazed aluminum plate-type heat exchanger made up of corrugated layers separated by plates, a second heat exchanger different from the previous type capable of allowing an indirect exchange of heat between just two fluids, a third heat exchanger, a purification unit comprising at least one distillation column and/or at least two phase separators coupled in series, a pipe for sending carbon dioxide-rich gas to cool down in the first exchanger, a pipe for sending the cooled gas or at least a fluid derived from the cooled gas, to the purification unit, a pipe for withdrawing a carbon dioxide-impoverished gas from the purification unit and connected to the first exchanger, a pipe for withdrawing a carbon dioxide-rich liquid from the purification unit and connected to a third exchanger for cooling the carbon dioxide-rich liquid, a valve for expanding the cooled liquid, the valve being connected to the second heat exchanger, and a pipe for sending a process fluid which is a gas derived from the gas cooled in the first exchanger from the first exchanger to the second exchanger in order to vaporize the carbon dioxide-rich liquid in the shell and a pipe for sending the gas produced by the vaporizing of the carbon dioxide-rich liquid in the second exchanger to the first exchanger to warm up, characterized in that it comprises a first phase separator, means for sending the at least partially condensed cooled gas from the first exchanger and to the first phase separator and means for sending the gas from the first phase separator to the second exchanger.

Means may be provided for sending a head gas of the distillation column and/or the gas vaporized in the second exchanger and/or a gas derived from the process fluid to the third exchanger to warm up upstream of the first exchanger.

According to other optional aspects, the apparatus comprises:
- means for sending the expanded liquid from the first phase separator to a second phase separator or to the distillation column.
- means for sending from the second exchanger to a second phase separator and means for sending the liquid from the second phase separator into the head of the distillation column to feed the distillation column.
- means for sending a gas from the second phase separator to warm up in the first exchanger.

The second exchanger may be a tube and shell exchanger, possibly comprising means for sending the carbon dioxide-rich liquid to warm up in the shell.

In layouts proposed in the patent application filed under number FR-1256778, the condensation of the $CO_2$ at the lowest temperature (close to the triple point) is performed using a technologically simpler second exchanger. As a result, an exchanger is therefore chosen that has just two passes (notably using tube and shell technology). The $CO_2$ is therefore condensed against the $CO_2$ from the column for distillation after it has been expanded in order to reach a temperature close to the triple point for $CO_2$. Now, other fluids (from the top of the distillation column, the top of the last separation pot for example) are also available at temperatures close to the triple point for $CO_2$ and cannot therefore exchange their frigories in order to condense the $CO_2$ in the coldest part if the exchanger devoted to this contains just two passes. If these fluids are to be used to condense the $CO_2$ and thus make use of the cold in these fluids use has to be made of the multi-pass main exchanger the temperatures of which are far higher (between −30 and −40° C. approximately at the coldest).

This solution has notable disadvantages:
- the cold is very difficult to put to use at low temperature by exchanging it against much warmer fluids and there is therefore a significant loss of exergy manifested in losses of energy (it will be necessary to vaporize more low-pressure liquid $CO_2$ in order to achieve the same condensation of the $CO_2$).
- the temperature difference in the multi-pass exchanger between the hot fluids and the cold fluids will become very great: if the cold point on the hot side is at −30° C. and at −52.5° C. on the cold side then the difference is 22.5° C. This difference is highly problematic given the mechanical stresses it causes, particularly to the brazing if the technology chosen is the brazed exchanger (which it typically is for cryogenic applications and multi-pass exchangers).

It is therefore necessary to look to exchange this low-temperature cold against a warm fluid which will be cooled down to similar temperatures.

The invention therefore consists in transferring the cold of these fluids to the $CO_2$ which will be vaporized at low pressure (at the cold end of the exchanger) and will then exchange it against the $CO_2$ that is to be liquefied. The low-temperature cold is therefore transmitted in the low-temperature part of the cold box, thus reducing exergy losses. In addition, if the "low pressure" $CO_2$ is cooled before it is expanded, then it will become supercooled, thus limiting the production of gas caused by its expansion. More cold is therefore available, thus optimizing the energy consumption of the system.

All the low-temperature cold fluids are warmed up to a temperature close to that of the "low pressure" (on nearing the supercooler). These fluids will then be able to transfer their frigories at higher temperature in the main exchanger.

This supercooler also applies in instances where cryogenic membranes are used in the cold box (cf. patent application filed under number FR-1256771). Specifically, the warming of the top of the pot before entering the membranes and making use of the cold of the permeate and of the residue can be achieved in the supercooler because they are at temperatures far closer to the triple point for $CO_2$ than the temperature of the main exchanger. The overall layout is as follows:

The invention proposed here seeks to make it possible to operate as close as possible to the triple point, or even with the liquid $CO_2$ at the triple point.

The invention relates to a method in which the carbon dioxide-rich liquid vaporizes in an exchanger allowing an indirect exchange of heat between just two fluids. This exchanger may for example be a "tube-shell" exchanger in which the $CO_2$ vaporizes in the shell and the stream that is to be condensed partially is in the tubes. Because the boiling liquid is in a shell, there is no longer any need to fear that the appearance of a solid phase will plug the passages and lead to localized overpressures as solid sublimates between two plugs of ice.

It is therefore possible to operate the pot at the pressure of the triple point for the boiling liquid, the solid $CO_2$ which appears sporadically will melt as the pressure rises back up above the triple point or as the liquid fed to the exchanger is superheated a little.

Any impurities that may be present in the vaporized liquid $CO_2$ will be removed from the exchanger:
- either in the gaseous phase in the case of the lightest ones
- or in a liquid purge in the case of the heaviest.

This liquid purge will be removed from the exchanger.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The invention will be described in greater detail with reference to FIGS. 1 to 3 which depict methods according to the invention.

Figure 1:
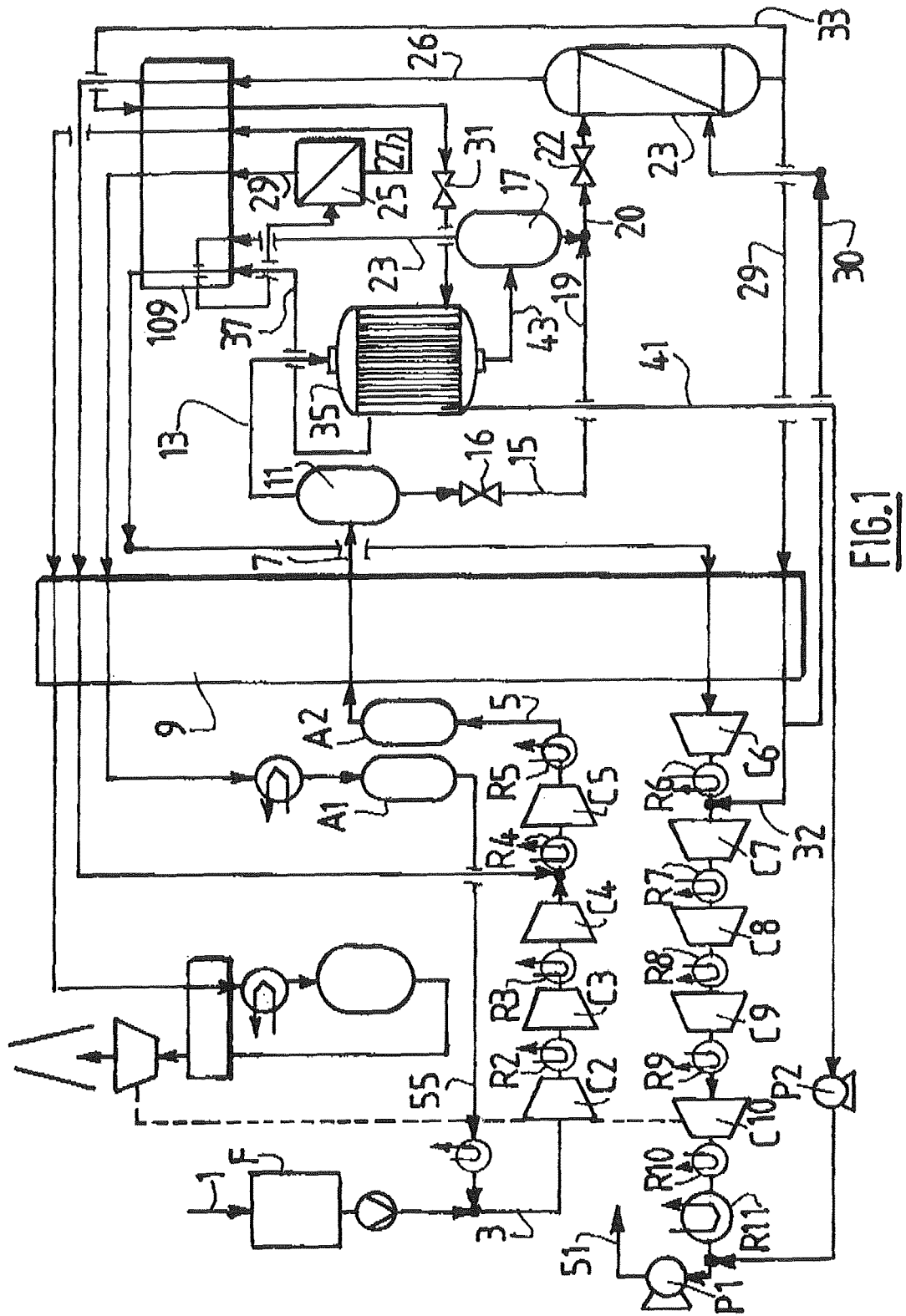
FIG. 1 provides an embodiment of the present invention.

In FIG. 1, a gas 1 contains at least 60 mol % of carbon dioxide, or even at least 80 mol % of carbon dioxide.

The remainder of the gas 1 may contain one or more of the following components: oxygen, nitrogen, argon, nitrogen oxide (NO or $NO_2$ or $N_2O$), carbon monoxide, hydrogen, mercury.

The gas is filtered in a filter F to remove dust then compressed in a first compressor stage C1 to form a compressed flow 3. The compressed flow 3 is compressed in a second compression stage C2, cooled in a cooler R2, compressed in a third compression stage C3, cooled in a cooler R3, compressed in a fourth compression stage C4, cooled in a cooler R4, compressed in a fifth compression stage C5 and cooled in a cooler R5 to form a flow 5 at between 6 and 20 bar abs. This flow of gas 5 is purified of water in a bed of absorbent A2 to form a purified flow 7. The purified flow 7 is partially condensed in a first exchanger 9, which is an aluminum exchanger made up of a stack of corrugated layers separated by plates. The partially condensed flow is sent into a first phase separator 11. The gas formed 13 is sent to the tubes of a second exchanger 35, allowing an indirect exchange of heat between just two fluids, of the tube and shell type. The figure illustrates the multitude of tubes in which the gas 13 derived from the gas condenses. The liquid formed 43 is sent to a second phase separator 17.

A gas 23 from the second phase separator 17 is warmed up in the third heat exchanger 109 which is a plate and fin exchanger. The liquid 19 from the second separator 17 is mixed with the liquid 19 from the first phase separator which is expanded in a valve 16 then is expanded in a valve 22 and sent to the top of the distillation column 23.

A head gas 26 from the distillation column 23, which is carbon dioxide-impoverished but enriched in at least one of the impurities (oxygen, nitrogen, argon, nitrogen oxide (NO or $NO_2$ or $N_2O$), carbon monoxide, hydrogen) is warmed up in the third heat exchanger 109 and then in the first heat exchanger 9.

A bottom liquid is withdrawn from the shell of the column and warmed up in the third exchanger 109. This liquid contains at least 80 mol % of carbon dioxide. The liquid is expanded in a valve 31 and then sent to the shell of the second exchanger 35 where it is partially vaporized. The gas 37 formed is warmed up in the third exchanger 109 and then in the first exchanger 9. From there it is compressed by a compression stage C6 and cooled in a cooler R6 before being mixed with the vaporized liquid 32. The gas thus formed is compressed by the stages C7, C8, C9 and cooled by the coolers R7, R8, R9, R10 to form a condensed gas. This condensed gas is mixed with the liquid purge 41 from the second exchanger and partially pumped by a pump P1 to form a pressurized liquid product 51 at at least 50 bar. The liquid purge 41 is pumped in a pump P2 beforehand.

The gas 23 from the second phase separator 17 is partially warmed up in the third heat exchanger 109, then separated by a membrane 25 to form a permeate 29 and a non-permeate 27. The non-permeate 27 is warmed up in the third and first exchangers then vented to the atmosphere. The permeate 29 is warmed up in the third and first exchangers then used to regenerate the bed of adsorbent A1 which is in regeneration phase. The flow 55 used for regeneration is mixed with the flow 3 downstream of the stage C1.

Quite obviously it is possible to vaporize the liquid 33 in the second exchanger 35 by indirect exchange of heat with another process fluid, for example a proportion of the vaporized bottom liquid.

It is possible to warm up the liquid 41 thus pumped in the pump P2 before mixing it with the liquid $CO_2$ at ambient temperature, in order to recuperate the frigories of the sensible heat of the purge.

Figure 2:
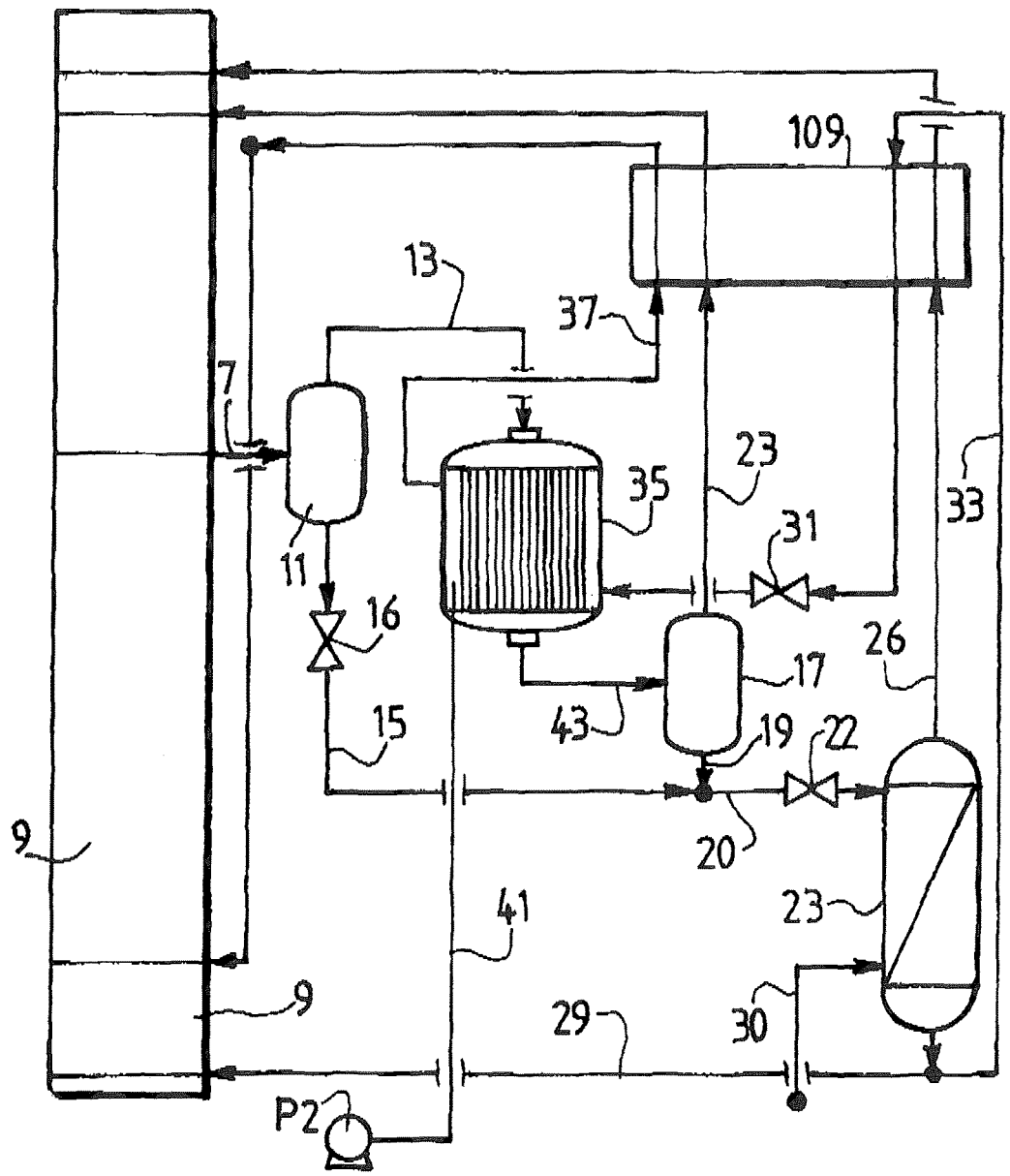
FIG. 2 provides an embodiment of the present invention.

In the alternative form of FIG. 2, the gas 23 is simply warmed up in the third exchanger and then in the first exchanger without having been separated by permeation.

Figure 3:
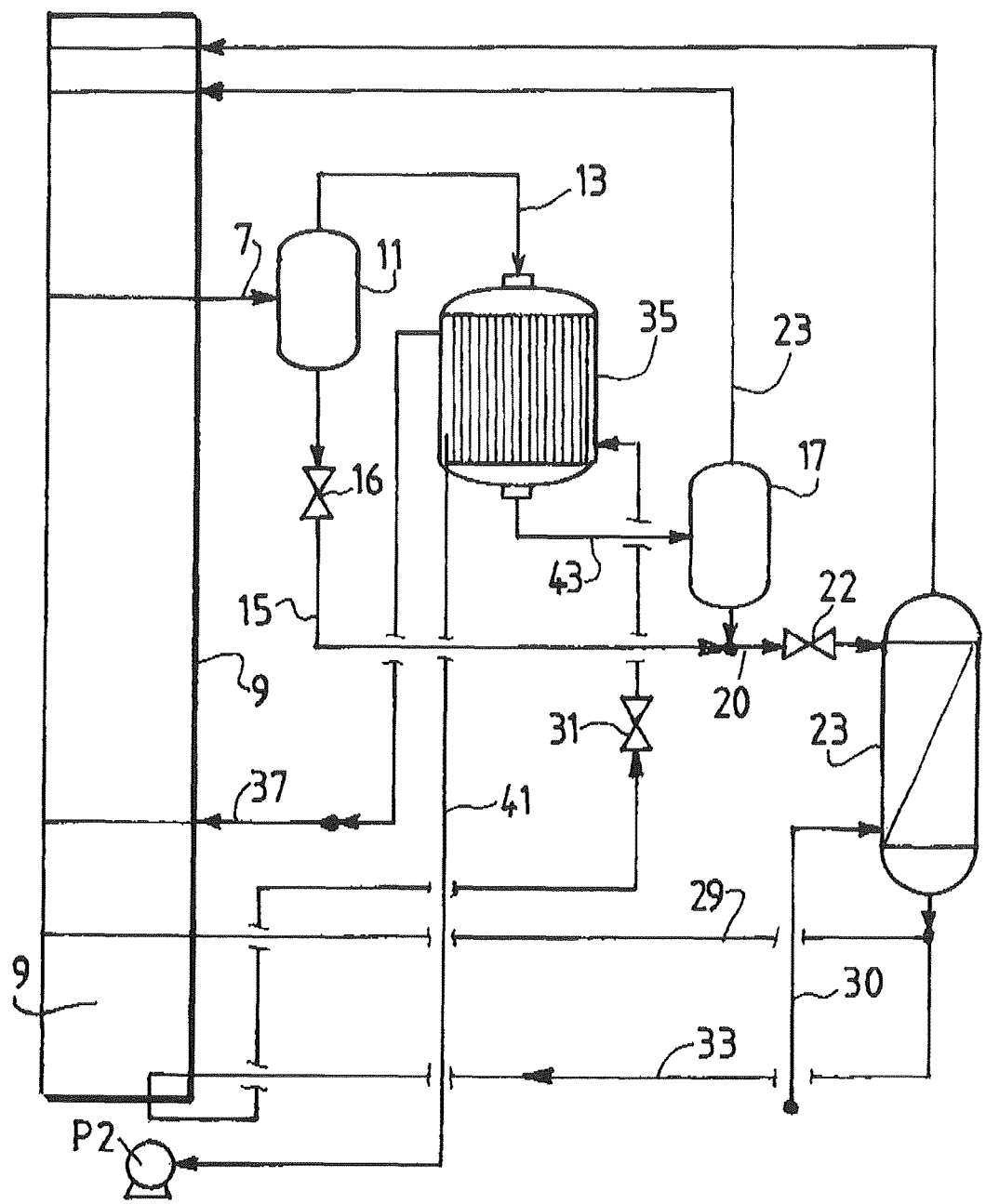
FIG. 3 provides an embodiment of the present invention.

In the alternative form of FIG. 3, the method corresponds to that of FIG. 2 except that the supercooler 109 is incorporated into the exchanger 9. Thus it may be seen that the liquid 33 is cooled as it travels partially through the exchanger 9 before being sent to the valve 31.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A method of purifying a carbon dioxide-rich feed gas at a sub-ambient temperature in order to produce a carbon dioxide-rich product stream, the method comprising the steps of:
   i) cooling and partially condensing the carbon dioxide-rich feed gas in a first heat exchanger to form a partially condensed carbon dioxide-rich fluid, wherein the first heat exchanger is of a brazed aluminum plate heat exchanger comprising corrugated layers separated by plates;
   ii) introducing the partially condensed carbon dioxide-rich fluid to a first phase separator to produce a first gas at a top of the first phase separator and a first liquid at a bottom of the first phase separator;
   iii) introducing the first gas to a second heat exchanger and condensing said first gas within the second heat exchanger against an expanded carbon dioxide-rich liquid thereby forming a second bottom fluid at a bottom of the second heat exchanger and a second gas at a top of the second heat exchanger, wherein the second heat exchanger is a shell and tube heat exchanger, wherein the second heat exchanger comprises a plurality of tubes disposed within the shell;

iv) introducing the second bottom fluid to a second phase separator to produce a third gas at a top of the second phase separator and a third liquid at a bottom of the second phase separator;

v) introducing the first liquid from the first phase separator and the third liquid from the second phase separator to a distillation column to produce a head gas at a top of the distillation column and a bottoms liquid at a bottom of the distillation column, wherein the head gas is carbon dioxide-lean as compared to the first liquid, wherein the bottoms liquid is carbon dioxide-rich as compared to the first liquid;

vi) subcooling the bottoms liquid without prior expansion to form a subcooled carbon dioxide-rich liquid and then expanding the subcooled carbon dioxide-rich liquid to form the expanded carbon dioxide-rich liquid;

vii) vaporizing the expanded carbon dioxide-rich liquid in the second heat exchanger to form the second gas at the top of the second heat exchanger, wherein the second gas is carbon dioxide-rich;

viii) warming the second gas in the second heat exchanger and then the first heat exchanger to form the carbon dioxide-rich product stream, ix) warming the third gas from the second phase separator in a third heat exchanger;

x) then introducing the third gas to a membrane separator to produce a permeate stream and a non-permeate stream, xi) warming the non-permeate stream in the first heat exchanger;

xii) warming the permeate stream in the first heat exchanger prior to using the permeate stream to regenerate an adsorbent bed;

xiii) recycling the permeate stream from the adsorbent bed to the carbon dioxide-rich feed gas upstream of the first heat exchanger, wherein the bottoms liquid is subcooled in step vi) in the third heat exchanger.

2. The method as claimed in claim 1, wherein the first gas from the first phase separator is condensed within the tubes of the second heat exchanger, and the expanded carbon dioxide-rich liquid is vaporized in the shell of the second heat exchanger.

3. The method as claimed in claim 1, wherein the first gas from the first phase separator and the expanded carbon dioxide-rich liquid are the only two fluids exchanging heat within the second heat exchanger.

4. The method as claimed in claim 1, wherein the head gas from the distillation column is heated in the first heat exchanger.

5. The method as claimed in claim 1, wherein the carbon dioxide-rich feed gas comprises an impurity selected from the group consisting of oxygen, nitrogen, argon, nitrogen oxides, carbon monoxide, hydrogen, mercury and combinations thereof.

6. The method as claimed in claim 1, wherein the shell of the second heat exchanger is operated at a pressure corresponding with the triple point of carbon dioxide.

\* \* \* \* \*